US005149483A

United States Patent [19]

Okey et al.

[11] Patent Number: 5,149,483
[45] Date of Patent: Sep. 22, 1992

[54] METHOD OF RESIN IMPREGNATING ELECTRIC MACHINERY

[75] Inventors: David W. Okey; Owen M. Briles; Francis T. Carriglitto, all of Rockford, Ill.

[73] Assignee: Sundstrand Corporation, Rockford, Ill.

[21] Appl. No.: 660,871

[22] Filed: Feb. 26, 1991

[51] Int. Cl.⁵ .................. B29C 45/18; B29C 45/46
[52] U.S. Cl. .................. 264/272.19; 264/272.13; 264/272.2; 264/313; 264/337
[58] Field of Search .................. 264/272.13, 272.19, 264/272.2, 313, 337

[56] References Cited

U.S. PATENT DOCUMENTS

| | | | |
|---|---|---|---|
| 2,489,867 | 11/1949 | D'Orio | 154/80 |
| 2,632,211 | 3/1953 | Trigg | 18/59 |
| 3,058,156 | 10/1962 | O'Connor | 264/272.2 |
| 3,608,023 | 9/1971 | Scarborough | 264/102 |
| 3,906,622 | 9/1975 | Sakano et al. | 264/272.2 |
| 4,492,884 | 1/1985 | Asano et al. | 264/272.13 |
| 4,681,718 | 7/1987 | Oldham | 264/272.13 |
| 4,765,942 | 8/1988 | Christensen et al. | 264/86 |

Primary Examiner—Hubert C. Lorin
Assistant Examiner—A. Ortiz
Attorney, Agent, or Firm—Antonelli, Terry, Stout & Kraus

[57] ABSTRACT

A method of impregnating electric machinery (32) containing windings with a resin (46) in accordance with the invention includes providing a vessel (30) for containing the electric machinery and an impreganting resin with the vessel having an interior volume (40) in contact with an exterior surface (42) of the electric machinery to be contacted with resin to impregnate the windings; heating the vessel containing the electric machinery to a temperature sufficient to reduce viscosity of the resin upon contact with the machinery to promote flow of resin into contact with the windings; contacting the heated vessel and electric machinery with the resin with the heated electric machinery reducing the viscosity of the resin with the reduced viscosity resin flowing into contact with the windings to be impregnated; curing the resin within the vessel to cause the resin to be retained in contact with the windings and removing the electric machinery from the vessel.

20 Claims, 3 Drawing Sheets

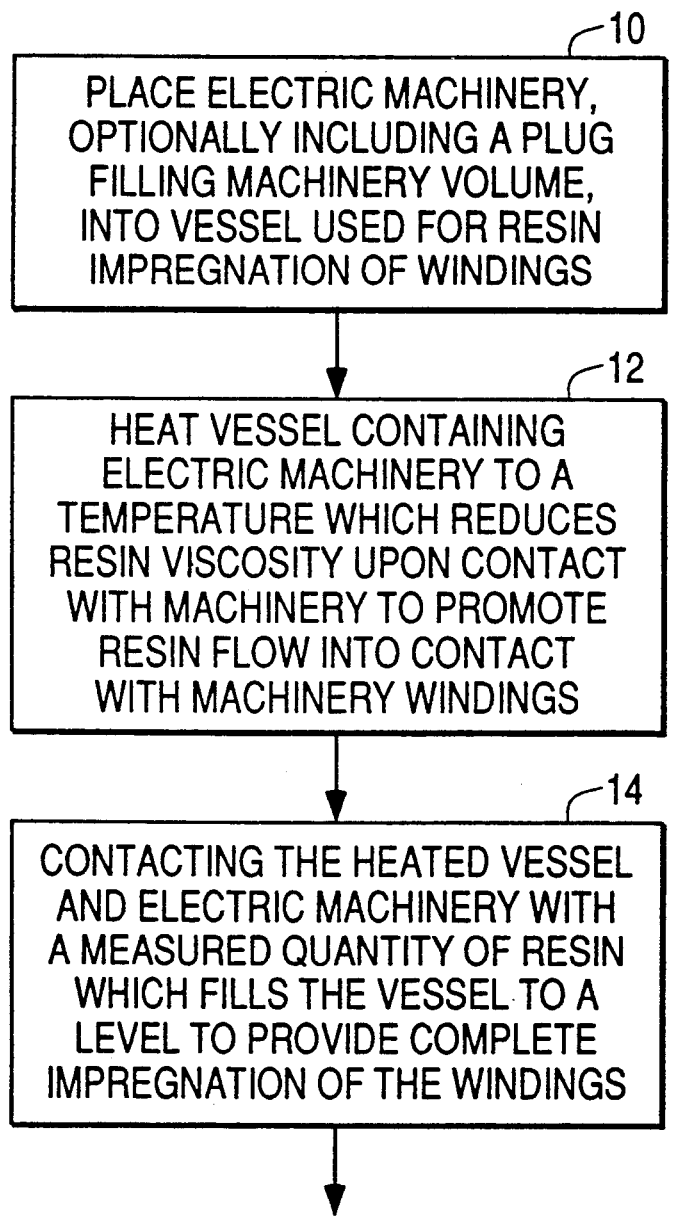

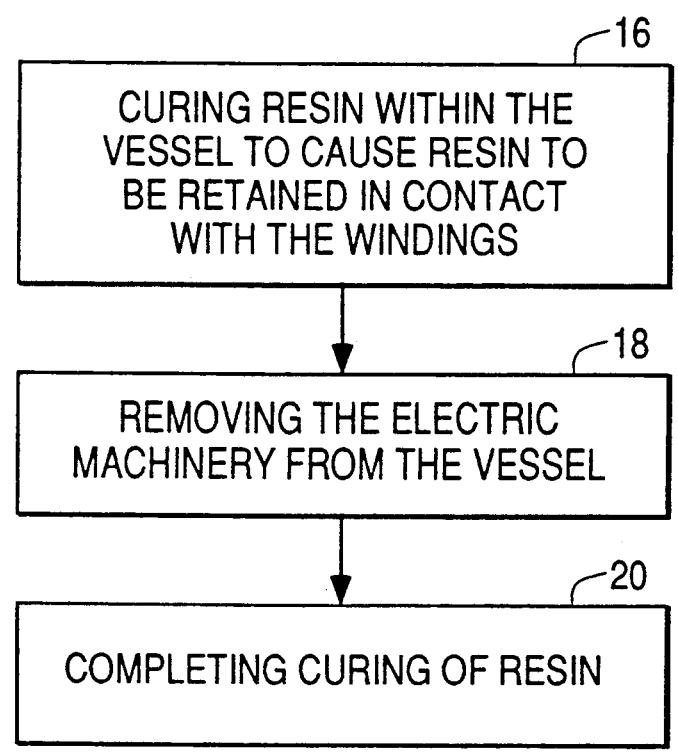

METHOD OF RESIN IMPREGNATING ELECTRIC MACHINERY

TECHNICAL FIELD

The present invention relates to processes for impregnating electric machinery such as, but not limited to, motors and generators, with resins.

BACKGROUND ART

Electric machinery such as, motors and generators, is conventionally impregnated with impregnation compounds. These compounds include varnishes, polyesters, polyamides and epoxies. The compounds are resin based. The main function of the resin is to mechanically restrain wires, such as windings contained within the slots of the rotor and stator of electric motors or generators, and a secondary function is to provide electrical insulation between the wires and the metallic slots and to provide thermal conductivity of heat away from the wires.

Two processes are conventionally used for impregnating electric machinery such as rotors and stators of electric motors and generators with resin based compounds. In a first process, the parts to be resin impregnated are dipped into a tank containing the resin. A combination of vacuum and/or pressure is used to force the resin into the desired areas to be impregnated such as in the slots containing the electric windings. After the dipping has been completed and the resin is heat cured as a consequence of thermal setting resins being conventionally used in this process, excess resin must be cleaned from the impregnated parts. This process is costly in implementation. A second process, known as the trickle impregnation process, utilizes heated resin which is heated to a temperature sufficient to reduce viscosity to permit flow along the wires of the electrical parts being impregnated which may be heated to cause impregnation of the slots and wires with the resin. Capillary action works on the resin to draw the resin into the interstices in the areas to be filled in the slots such as in between the wires. The disadvantage of this process is that it can only be utilized with resins which have a sufficiently low viscosity, such as 50-2500 cp. Many high performance resins have a higher viscosity especially after they have been mixed for several days with viscosity ranges such as 70,000 cp being possible. The second process suffers from the further disadvantage that the volume of resin which is used is not readily controlled as a consequence of no containment vessel being used. Furthermore, it is difficult to achieve a uniform coating of resin in areas of the electric machinery to be impregnated with the resin. Finally, the flow of resin onto selected areas of the electric machinery to be impregnated is difficult to control as a consequence of no containment vessel being used which is shaped to a contour of areas which are desired to be impregnated with resin.

U.S. Pat. No. 2,632,211 discloses a system for resin impregnating coils of electric machinery. The coils to be resin impregnated are held in an elastomeric mold. The resin is injected with a hollow tube underneath the turns of the wrapping of the coil until the resin begins to escape. Thereafter, the mold is pressurized causing deformation of the elastomer which prevents any substantial amount of resin from escaping from the coil. Thereafter, the mold is heated to cure the resin. This system has the disadvantage of relying upon pressure for introducing the resin underneath the turns of the wrapping of the coil. As a result of the resin being unheated, the energy necessary for causing the resin to flow in contact with the electric coils must be supplied either from pressure from the resin source or capillary action. Furthermore, the temperature of the coils which are placed within the mold cavity is not elevated. As a result, the viscosity of the resin is not lowered by contact with the electric coils which lessens the effect of capillary action and requires pressure to force the resin into the interstices of the windings.

DISCLOSURE OF INVENTION

The present invention is an improved method for impregnating electrical machinery such as rotors and stators of motors or generators with resins to provide structural support for the wires within the windings, electrical insulation and thermal conduction of heat from the windings. The invention provides a lower cost method of impregnating the windings of electric machines which provides complete impregnation of the windings while minimizing the consumption of resin with the uniform coating thickness of resin on the parts of the electric machinery to be resin impregnated.

The electric machinery to be impregnated is placed within a vessel and heated to a temperature sufficient to reduce the viscosity of resin which has been mixed and stored at room temperature for impregnation of the electric machines upon contact with the electric machine. The resin contacting the electric machine is heated to a degree sufficient to reduce its viscosity and promote capillary action drawing the resin into the interstices within the electric machine to be impregnated with the resin such as, but not limited to, the slots of rotors and stators of electric motors and generators. Furthermore, gravity and/or reduced atmospheric pressure may be further used to promote the flow of resin into the interstices of the electric machine to be impregnated. The vessel which contains the electric machinery to be impregnated has an interior contour which matches a contour of at least a part of the electric machinery to provide a uniform thickness of cured resin contacting the part of the electric machinery. The resin is dispensed in a measured quantity which fills the vessel to a predetermined level to provide complete impregnation of the windings. A plug may be inserted into the electric part to be impregnated to displace a volume within the electric machinery so that the volume is not filled with resin to minimize the amount of resin required to fill the vessel to the predetermined level. As a result, the cost of the resin impregnation process for achieving complete resin impregnation necessary for providing optimal mechanical support of the windings, electrical insulation and thermal conductivity is reduced.

A method of impregnating electric machinery containing windings with a resin in accordance with the invention includes providing a vessel for containing the electric machinery and an impregnating resin with the vessel having an interior volume which provides resin in contact with an exterior surface of the electric machinery to be contacted with resin to impregnate the windings when resin is added to the vessel; heating the vessel containing the electric machinery to a temperature sufficient to reduce viscosity of the resin upon contact with the machinery to promote flow of the resin into contact with the windings; contacting the heated vessel and electric machinery with resin with the heated electric machinery and vessel which heats the resin from a storage temperature to a temperature sufficient to reducing the viscosity of the resin and promote capillary action with the reduced viscosity resin flowing into, contact with the windings to be impregnated, and the capillary action drawing the heated resin into intensities with the electric machine curing the resin within the vessel to cause the resin to be retained in contact with the windings; and removing the electric machinery from the vessel. The vessel has an interior contour which matches a contour of at least a part of the electric machinery to provide a predetermined thickness of cured resin contacting the part of the electric machinery to be impregnated with resin. The resin prior to contact with the machinery may have a viscosity in a range between 20-50,000 cp with 300-3,000 cp being preferred. Preferably, the resin comprises a thermosetting resin. The method further includes curing the resin after the removal of the electric machinery from the vessel by heating of the electric machinery which has been contacted with the resin.

The vessel comprises a material which is flexible to permit removal of the electric machinery from the vessel by deformation of the vessel and to which the resin does not adhere upon deformation to permit removal of the machinery by deformation. The vessel may be made from various elastomeric materials with a preferred material being silicone rubber.

The contacting of the heated vessel and electric machinery with resin is performed by dispensing a measured quantity of the resin which fills the vessel to a predetermined level to provide complete impregnation of the windings while minimizing the quantity of resin which is used during impregnation of the electric machinery. Contact of the windings of the electric machinery is produced by gravitational force and capillary action acting on the resin which draws the resin into contact with the windings. Contact of the windings of the electrical machinery may be additionally produced by a pressure acting on the electric machinery below atmospheric pressure.

The electric machinery may define a volume which does not contain windings; and a plug is placed into the volume to fill the volume prior to heating of the vessel containing the electric machinery so that the volume is not filled with resin during contacting of the heated vessel, plug and electric machinery with resin.

BRIEF DESCRIPTION OF DRAWINGS

FIGS. 1A and 1B illustrate a flowchart of a process in accordance with the present invention.

BEST MODE FOR CARRYING OUT THE INVENTION

Figure 3:
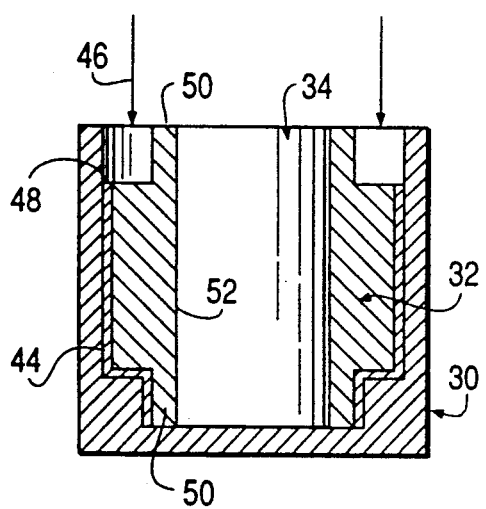
FIG. 3 illustrates a sectional view of an electric machine placed within the vessel which contains a plug.

The present invention is an improved process for impregnating electric machinery such as, but not limited to, stators and rotors of electric motors and generators with resin to mechanically fix windings of the electric machinery to provide structural support, electric insulation of the windings from the conductive parts of the electric machinery and thermal conductivity of heat produced by the windings during operation with a resin which is preferably a thermosetting resin. With the invention, the electric machinery to be impregnated is placed within a vessel and heated to a temperature which reduces resin viscosity upon contact of the resin with the electric machinery and vessel. The temperature of the resin is maintained prior to contact with the electric machinery below the temperature to which the electric machinery and vessel are heated for reducing viscosity to promote resin flow into contact with the machinery windings. Maintaining the resin at a temperature lower than the temperature to which the resin is heated prior to contact with the heated electric machinery, vessel and optional plug during impregnation usually promotes the useful time during which the resin may be used for impregnation. Contact of the cooler resin with the heated vessel and the electric machinery reduces viscosity of the resin which promotes flow into the interstices of the windings and parts of the electric machinery such as slots in the rotor or stator, promotes capillary action drawing the reduced viscosity resin into the interstices of electric machinery and enhances flow caused by gravitational force or force produced by reduced pressure below atmospheric pressure which is applied to the electric machinery during the contacting of the resin with the electric machinery within the vessel. The resin is partially cured to fix it in place prior to removal of the vessel. The vessel preferably is flexible and is made from a material which does not adhere to the cured resin upon deformation of the vessel during removal of the electric machinery. The invention provides complete impregnation of the interstices of the electric machinery at reduced cost as a consequence of the vessel providing a containment mechanism for resin which contacts the heated electric machinery and vessel which minimizes the amount of resin which is required to be used during impregnation. The vessel has an interior contour which matches a contour of at least an exposed part of the electric machinery to provide minimal thickness of cured resin contacting the part of the electric machinery to be impregnated with resin. In many parts of the electric machinery which are nonabsorptive of resin there will be little or no accumulation of resin such as the outer surface of a rotor or stator. A measured amount of resin contacts the heated electric machinery and vessel to fill the vessel to a predetermined level to provide complete impregnation of the windings with a minimum quantity of resin to produce a minimal quantity of cured resin contacting any part of the electric machinery which is not to be resin impregnated.

Figure 2:
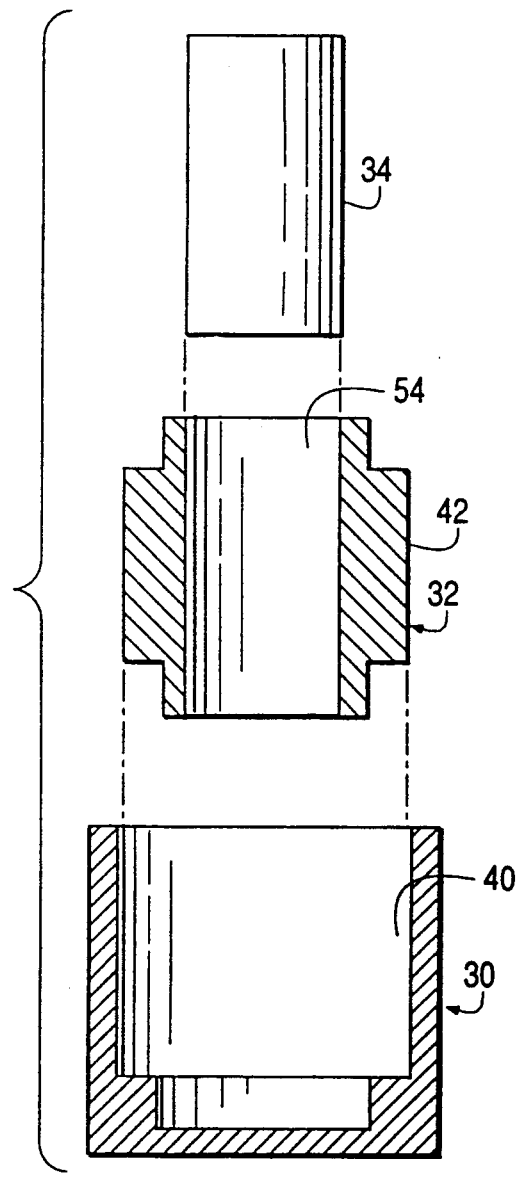
FIG. 2 illustrates an exploded view of an electric machine to be resin impregnated, vessel and plug.

FIGS. 1A and 1B illustrate a flowchart of a process for impregnating electric machinery in accordance with the present invention. The process proceeds from step 10 at which the electric machinery to be impregnated, including an optional plug filling a machinery volume as discussed below in conjunction with FIGS. 2 and 3, is placed into the vessel used for resin impregnation of the windings. The vessel is made from an elastomeric substance which preferably is silicone rubber which may be deformed to permit removal of the cured electric machinery and which does not adhere to the electric machinery upon deformation of the vessel during removal. The inner contour of the vessel may be made by using the actual article to be impregnated to provide an impression of the inner contour of the vessel in accordance with any molding process. The resin may be chosen from different types of resins including, but not limited to, thermosetting resins and thermoplastic resins. Thermosetting resins are preferred as a consequence of their physical properties after curing which provide strong structural support for the windings of the electrical machinery, provide substantial electrical insulation from metallic parts of the electric machinery in which the windings are placed such as the slots of a rotor or a stator of an electric motor or generator and substantial thermal conductivity for carrying heat from the electric windings with a thermal conductivity greater than that of air. Examples of resins which may be used in the practice of the present invention without limitation thereto are polyesters, polyamides, epoxies, polyethylene terephthalate and polybutylene terephthalate. Furthermore, the resins may be filled with filling agents such as agents which provide increased mechanical strength of the resin and thixotropic agents which permit the resin to flow under applied pressure but retain the resin in place once the pressure is removed. After placement of the electric machinery within the vessel at step 10, the process proceeds to step 12 where the vessel containing the electric machinery and the optional plug is heated to a temperature which reduces the resin viscosity upon contact with the machinery to promote resin flow into contact with the machinery windings by the combined effects of the reducing of the viscosity of the resin as a consequence of it being heated by contact with the electric machinery, capillary action which is promoted by reducing the viscosity of the resin, gravitational force, which causes the resin to flow downward from a point of application at which the resin is poured into contact with the machinery and an optional reduction of atmospheric pressure during the contacting of the electric machinery with the resin caused by the application of reduced atmospheric pressure to the vessel containing the electric machinery which may be produced by a vacuum bag enveloping the vessel containing the electric machinery. The process proceeds to step 14 where the heated vessel and electric machinery is contacted with a measured quantity of resin which fills the vessel to a level to provide complete impregnation of the windings or other parts of the electric machinery to be resin impregnated. The shaping of the inner contour of the vessel to correspond to the exterior shape of the electric machinery permits the volume of resin required to fill the vessel up to the predetermined level to be minimized which reduces the quantity of resin which is consumed with the process of the present invention thereby lowering the cost of impregnation. Using the stored heat of the vessel and electric machinery to reduce the viscosity of the unheated resin maximizes shelf life for the activated resin. The process proceeds to step 16 in which the resin is cured within the vessel sufficiently to cause the resin to retained in contact with the windings. A temperature of 200° F. to 250° F. may be used for many types of resins. The partial curing of resin produced at step 16 may be produced by heating of the machinery contained in the vessel for a short period of time. The initial curing step may be produced by heating of the vessel and electric machinery in an oven for a period, such as twenty minutes, between a range of 200°-250° F. The process proceeds to step 18 where the electric machinery is removed from the vessel. As described above, the vessel is manufactured from an elastomeric material which is flexible and does not adhere to the electric machinery when the elastomer is deformed during removal of the electric machinery. The process proceeds to step 20 where the completing of curing of the resin occurs. The resin may be cured by placement in an oven where elevated temperatures complete the polymerization or cross-linking of a thermosetting resin used for resin impregnating the windings. The temperature at which the resin is cured and the time required for curing may vary depending upon the nature of the resin being used and the nature of the electric machinery but a temperature of 350° F. for at least one hour may be used.

FIG. 2 illustrates an exploded view of a vessel 30, stator 32 and plug 34 prior to assembly and FIG. 3 illustrates the assembled vessel, stator and plug. Like reference numerals identify like parts in FIGS. 2 and 3. It should be understood that the process of the present invention is not limited to the resin impregnation of particular electric machinery parts such as the stator 32. The vessel 30 has an interior contour 40 which matches an exterior contour 42 of at least a part of the electric machinery to provide a minimal thickness of cured resin or no resin at all contacting any part of the electric machinery not to be impregnated with resin. The thickness 44 is typically minimal as a consequence of the matched contours 40 and 42. Furthermore, minimizing the thickness 44 minimizes the consumption of resin which increases the cost effectiveness of the overall impregnation process by limiting the amount of resin which is consumed for impregnating each separate piece of electric machinery. The resin 46, which may be poured into the vessel 30 from above to utilize gravitational force, fills the vessel 30 to a predetermined level 48. A fixed measured quantity of resin is utilized for impregnating individual pieces of electric machinery 32 to minimize the consumption of resin and to avoid filling the vessel 30 to a level above the desired level to be wetted with resin desired to be impregnated, such as the end turns 50 of a stator which are not contacted with resin. The windings (not illustrated) are disposed within the slots 52 of the stator which are not illustrated in detail as a consequence of their being well-known in the art. Each slot 52 contains a plurality of turns of wire which project out of the slot to form the end turns 50. The plug 34 is placed into the center 54 to fill the volume of the center prior to heating of the vessel 30 containing the electric machinery 32 so that the volume is not filled with resin during contacting of the heated vessel, plug and electric machinery with resin to minimize the volume of resin required to be used to wet each piece of electric machinery to be impregnated.

The process of the present invention may be utilized with resins of different viscosity. The resins may have a range between 20-50,000 cp with 300-3,000 cp being a preferred range with thermosetting resins being the preferred type of resin.

The invention provides advantages over the prior art processes. In the first place, the heating of the vessel and electric machinery to a temperature which reduces the viscosity of the resin upon contact promotes the useful life of the mixed resin as a consequence of the temperature of the resin not being elevated prior to contact with the electric machinery to be impregnated. Furthermore, the shaping of the inner contour 40 of the vessel 30 to match the outer contour 42 of the electric machinery 32 and the shaping of the outer contour of the plug 34 to match the inner contour of the electric machinery minimizes the volume of resin 46 which is placed within the vessel to fill the vessel up to the predetermined height 48 above which it is not desired to wet the electric machinery. As a consequence, almost all of the resin 46 introduced into the vessel 30 is used in contacting the windings within the slots or other areas to be impregnated which is the area where resin impregnation is desired for mechanical, electrical and thermal performance characteristics. Finally, the vessel provides a mechanism for containing any excess resin which runs off of the partially cured resin 46 contacting the electric machinery 32 at step 18 and prevents spillage thereby simplifying cleanup. Minimizing the consumption of resin and simplifying cleanup reduce the costs of overall impregnation process when compared with the prior art processes which do not minimize resin consumption and further suffered from costs associated with spillage.

While the invention has been described in terms of its preferred embodiment, it should be understood that numerous modifications may be made thereto without departing from the spirit and scope of the invention as defined in the appended claims. For example, while a preferred usage of the process of the present invention is to resin impregnate rotors and stators of generators, it should be understood that the invention may be used to impregnate parts of diverse types of electric machinery. Furthermore, it should be understood that the present invention is applicable to impregnation processes of electric machinery for resins which have high viscosities prior to contact with the heated vessel and electric machinery. Further, the plug may be an integral part of the containment vessel. Finally, it should be understood that the present invention may be used to impregnate electric machinery with diverse types of resins of both a thermosetting and thermoplastic nature including additives to change the flow properties of the resins. It is intended that all such modifications fall within the scope of the appended claims.

We claim:

1. A method of impregnating electric machinery containing windings with a resin comprising:
   providing a vessel for containing the electric machinery and an impregnating resin with the vessel having an interior volume which provides resin in contact with an exterior surface of the electric machinery to be contacted with resin to impregnate the windings;
   heating the vessel containing the electric machinery to a first temperature sufficient to reduce viscosity of the resin upon contact with the machine and vessel to promote flow of the resin into contact with the windings; and
   contacting the heated vessel and electric machinery with the resin under atmospheric or less than atmospheric pressure said vessel and machinery heating the resin from a storage temperature, maintained below said first temperature to a second temperature sufficient to reduce the viscosity of the resin and promote capillary action with a reduced viscosity resin flowing into contact with the windings to be impregnated and the capillary action drawing the heated resin into interstices within the electric machine.

2. A method in accordance with claim 1 wherein:
   the vessel has an interior contour which matches a contour of at least a part of the electric machinery to provide a minimal thickness of resin contacting the part of the electric machinery during impregnation with resin.

3. A method in accordance with claim 1 wherein:
   the resin prior to contact with the machinery has a viscosity in a range between 20 to 50,000 centipoise.

4. A method in accordance with claim 3 wherein:
   the resin prior to contact with the machinery has a viscosity in a range between 300 to 3,000 centipoise.

5. A method in accordance with claim 2 wherein:
   the resin prior to contact with the machinery has a viscosity in a range between 20 to 50,000 centipoise.

6. A method in accordance with claim 5 wherein:
   the resin prior to contact with the machinery has a viscosity in a range between 300 to 3,000 centipoise.

7. A method in accordance with claim 1 wherein:
   the resin comprises a thermosetting resin.

8. A method in accordance with claim 2 wherein:
   the resin comprises a thermosetting resin.

9. A method in accordance with claim 3 wherein:
   the resin comprises a thermosetting resin.

10. A method in accordance with claim 4 wherein:
    the resin comprises a thermosetting resin.

11. A method in accordance with claim 5 wherein:
    the resin comprises a thermosetting resin.

12. A method in accordance with claim 6 wherein:
    the resin comprises a thermosetting resin.

13. A method in accordance with claim 1 further comprising:
    curing the resin after removal of the electric machinery from the vessel by heating of the electric machinery which has been contacted with the resin.

14. A method in accordance with claim 1 wherein the vessel comprises:
    a material which is flexible to permit removal of the electric machinery from the vessel by deformation of the vessel and to which the resin does not adhere during deflection to permit removal of the machinery by the deformation.

15. A method in accordance with claim 14 wherein the vessel comprises:
    silicone rubber.

16. A method in accordance with claim 1 wherein:
    the contacting of the heated vessel and electric machinery with resin is performed by dispensing a measured quantity of the resin which fills the vessel to a predetermined level to provide complete impregnation of the windings with a minimum quantity of resin to produce a minimal thickness of cured resin contacting a part of the electric machinery during impregnation.

17. A method in accordance with claim 16 wherein:
    contact of the windings of the electric machinery is produced by gravitational force and capillary action acting on the resin which draws the resin into contact with the windings.

18. A method in accordance with claim 17 wherein:
    contact of the windings of the electric machinery is additionally produced by a pressure acting on the electric machinery below atmospheric pressure.

19. A method in accordance with claim 1 wherein:
    the electric machinery defines a volume which does not contain windings; and
    a plug is placed into the volume to fill the volume and heating with the vessel containing the electric machinery so that the volume is not filled with resin during contacting of the heated vessel, plug and electric machinery with resin.

20. A method in accordance with claim 1 wherein:
    the electric machinery defines volume which does not contain windings; and
    a plug is placed into the volume to fill the volume and heating with the vessel containing the electric machinery so that the volume is not filled with resin during contacting of the heated vessel, plug and electric machinery with resin.

* * * * *